United States Patent [19]

Belka

[11] Patent Number: 4,537,338
[45] Date of Patent: Aug. 27, 1985

[54] BAGGAGE CARRIER FOR TWO-WHEELED VEHICLES

[75] Inventor: Heinrich Belka, Bielefeld, Fed. Rep. of Germany

[73] Assignee: Esge-Marby GmbH & Co. KG, Bielefeld, Fed. Rep. of Germany

[21] Appl. No.: 599,535

[22] Filed: Apr. 12, 1984

[30] Foreign Application Priority Data

Apr. 12, 1983 [DE] Fed. Rep. of Germany ....... 3312994
Aug. 23, 1983 [DE] Fed. Rep. of Germany ....... 3330286
Dec. 3, 1983 [DE] Fed. Rep. of Germany ....... 3343844

[51] Int. Cl.³ ................................................ B62J 7/04
[52] U.S. Cl. .................................. 224/39; 224/32 A; 403/374
[58] Field of Search ............... 224/30 R, 32 R, 32 A, 224/39; 403/374, 379, 324, 314

[56] References Cited

U.S. PATENT DOCUMENTS 4,113,158  9/1978  Niemann .................................. 224/39
4,408,705 10/1983  Niemann .................................. 224/39

*Primary Examiner*—Stephen Marcus
*Assistant Examiner*—David Voorhees
*Attorney, Agent, or Firm*—Frishauf, Holtz, Goodman & Woodward

[57] ABSTRACT

A baggage carrier for two-wheeled vehicles includes a frame forming the supporting surface for the baggage and respective pairs of support legs at each side extending downward from the frame. The legs extending toward one another in the form of a V and secured, optionally in an articulated manner, to the frame are bent at their ends in such a manner that they extend approximately parallel to and spaced apart by a short distance from one another. The free ends of the legs of each pair of legs are adjustably secured on an extension piece of the vehicle frame by means of a clamping part, which has a bore for a fastening screw that passes between the two ends of the legs and through a bore in the extension piece.

In order to provide a wide range of adjustment for the two legs of each pair of support legs without impairing the crosswise stability of the support legs, so that it is possible to adapt the baggage carrier to various two-wheeled vehicles without altering the baggage carrier itself, the clamping part has two continuous reception bores extending parallel to one another and intended for the two associated cylindrical ends of the legs. At least one clamping piece that cooperates with the inserted ends of the legs is associated with the reception bores and can be tightened by means of a clamping screw in order to fix the ends of the legs in position.

18 Claims, 15 Drawing Figures

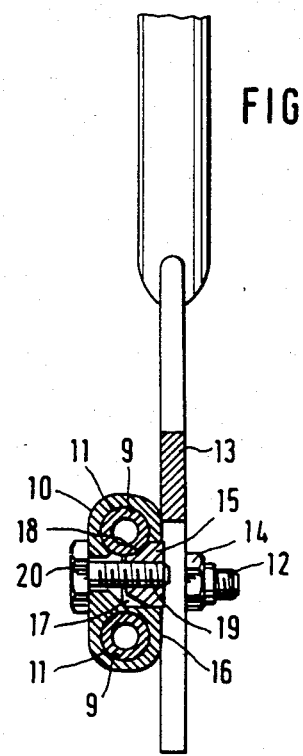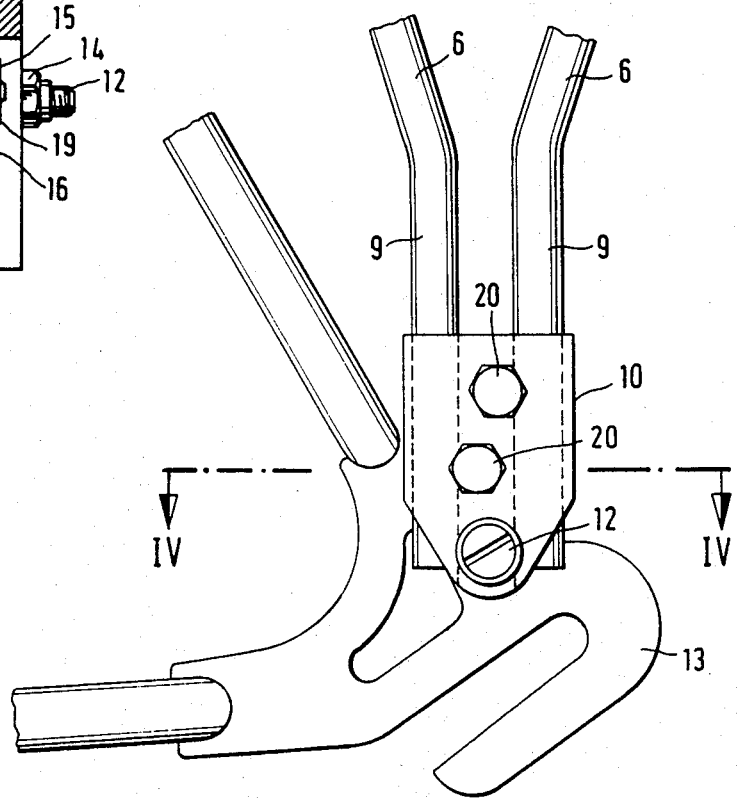

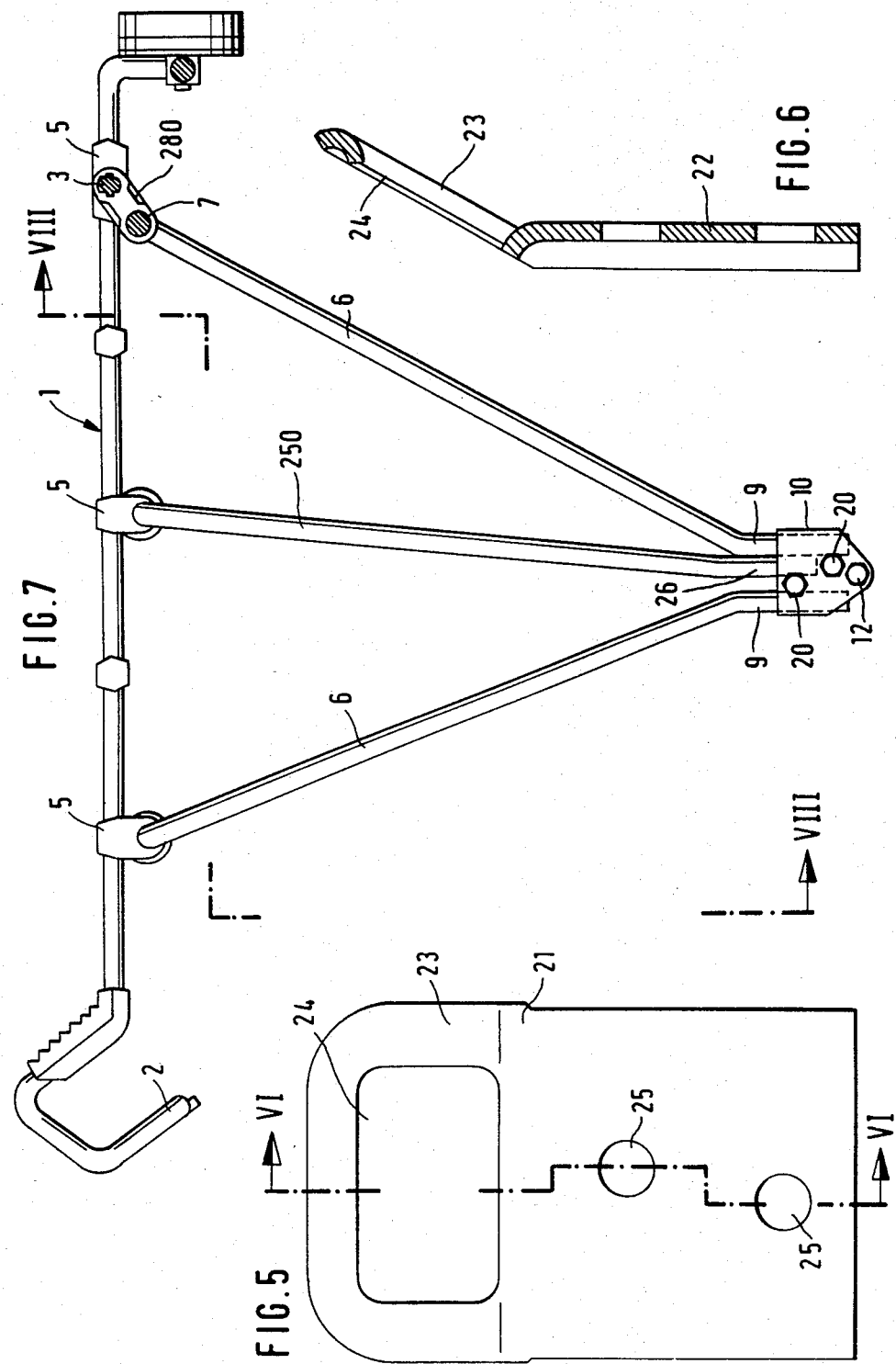

BAGGAGE CARRIER FOR TWO-WHEELED VEHICLES

The present invention relates to a baggage carrier for two-wheeled vehicles, comprising a frame that includes the supporting surface for the baggage and a pair of support legs at either side extending downward from the frame. The support legs, which extend toward one another in a V, are secured to the frame, optionally in an articulated manner, and their free ends are bent at an angle such that they extend approximately parallel to and are spaced apart by a short distance from one another. These free ends of each pair of support legs can be secured to an extension piece of the vehicle frame by means of a clamping part mounted on them. The clamping part has a bore for a fastening screw that is passed between the two ends of the legs and through a bore in the extension piece.

BACKGROUND

In a known baggage carrier of this type (U.S. Pat. No. 4,113,158), the two free ends of the round legs of each pair of support legs are flattened and are provided with ribbing, and the clamping part is embodied as a U-shaped clip. The clip encompasses the two free ends of the legs and can be fastened to the extension piece of the vehicle frame by means of the locking screw. When the baggage carrier is being assembled, the supporting surface for the baggage is oriented horizontally, whereupon the flattened neds of the legs are fixed in the respective installed position by means of the clamping clip. The available distance by which the legs can be adjusted is limited, however, by the length of the flattened ends of the legs and by the space between these ends in the area of the axle. In practice, approximately 10 mm is available for adjustment of the legs, and because of the many types of two-wheeled vehicles on the market this means that manufacturers must make and keep in inventory a relatively large number of baggage carriers, with various lengths of support legs. Furthermore, the flattening of the free ends of the support legs which is required for receiving the clamping clip means that the legs are physically weakened to a certain extent, which impairs the stability of the baggage carrier in the crosswise direction.

In another baggage carrier known on the market, the clamping part is embodied as a molded plastic part, which has two blind bores serving to receive the free ends of one pair of legs, the axes of the bores forming an acute angle with one another in accordance with the V-shaped arrangement of the legs of the pair of support legs. The rear leg of the pair of support legs is rigidly connected with the clamping part; only the forward leg is adjustable, within a limited range, and fixable in its respective installed position by means of a clamping device in the form of a clamping clip. The adjustability of the forward leg permits nothing more than merely compensating for dimensional deviations within one and the same vehicle type. In principle, an adaptation to various vehicle types is impossible.

THE INVENTION

It is therefore an object to create a baggage carrier which, without impairing the crosswise stability of the support legs, has a wide range for adjustment of the two legs of each pair of support legs, so as thereby to enable an adaptation to various types of two-wheeled vehicles.

Briefly, the clamping part of the carrier of the present invention has reception bores for the two associated cylindrical ends of the legs, these bores extending parallel to one another and being located at either side of the bore for the fastening screw. Associated with these continuous reception bores is at least one clamping piece which cooperates with the inserted ends of the legs and which can be tensed by means of a locking screw against the ends of the legs and against the clamping part, thereby fixing the ends of the legs in their respective installed positions.

In this baggage carrier, the ends of the legs of each pair of support legs retain their cylindrical or round cross-sectional shape, so that there is no weakening or impairment of crosswise stability. Furthermore, the range of adjustment can be selected such that it is large enough for any practical requirements, without having to make any particular alterations in the legs or the baggage carrier to this end. Still further, the ends of the legs are held and fixed perfectly in the reception bores of the clamping part, which means that the baggage carrier is also distinguished by its ability to support heavy loads. The need no longer exists, as in the prior art, to manufacture and keep on hand baggage carriers with different lengths of support legs.

In order to facilitate the individual adjustment of the two free ends of the legs of a pair of support legs, a preferred form of embodiment provides that each of the two reception bores may have associated with it its own clamping piece with a locking screw. It is also suitable for the flat clamping part to have a contact face on one side, which is to be placed against the extension piece, and for the clamping piece or pieces to be disposed in the vicinity of this contact fact. In the assembled state, the clamping piece is then located on the side of the clamping part oriented toward and covered by the extension piece, while the locking screw itself is easily accessible from the front side.

Each clamping piece may advantageously be embodied as a clamping wedge or cone, which is guided in a correspondingly shaped recess of the clamping part and is supported with its wedge or cone surface on the end of the leg through an opening toward the wall of the associated reception bore. Very simple structural relationships are attained if the clamping wedge or cone has a threaded bore for the locking screw, the locking screw being accessible from the direction of the outside of the clamping part.

To enable embodying the clamping part in as small a size and as attractively as possible, it is advantageous for each clamping piece and the associated locking screw to be disposed in the vicinity between the two reception bores. If there are two clamping pieces, each of which is associated with one of the ends of the legs, then the two clamping pieces may be disposed beside one another, viewed in the direction of the two ends of the legs.

Operators of two-wheeled vehicles often express the desire to use the baggage carrier together with an elastic belt, which serves to secure the baggage located on the baggage carrier. For inserting the belt, a belt holder having an opening for the belt can be disposed at the outset on the clamping part, either being molded in one piece with the clamping part or secured thereto by means of a locking screw.

If relatively heavy loads are to be transported with the baggage carrier, where a baggage carrier having two pairs of support legs is too weak or too much vulnerable to oscillation, a further support leg is suitably disposed between the support legs of each pair, the free end of this third leg being bent such that it is parallel to the ends of the associated pair of support legs and being secured to the clamping part.

A disposition which is particularly invulnerable to oscillation is attained if the two support legs which are located opposite one another with respect to the longitudinal axis of the vehicle and which engage the frame that forms the baggage rest more toward the rear than the other legs extend toward one another such that they are farthest apart at the clamping parts and are closest together at the frame.

In a baggage carrier having three support legs on each side, a very simple fastening which as before is adjustable in height is attained by the use of a clamping part which has a third reception bore for the middle support leg located between the two outer reception bores for the front and back support legs and extending parallel to these reception bores. In this case, the clamping part becomes quite flat, if the longitudinal axes of all the reception bores are located in the same plane. Still more space can be saved if the third reception bore for the middle support leg is realized as a blind bore, which has the further advantage that the middle support leg is held in a positive manner and cannot slip through toward the bottom.

The assembly and clamping of the ends of the legs in the clamping part become very simple if the third reception bore for the middle support leg is disposed tightly against one of the two outer reception bores such that at the rim it merges therewith, while one of the clamping pieces is disposed between the third reception bore for the middle support leg and the outer, separate, reception bore. This clamping piece is supported, through an opening toward the wall in the third reception bore and through a further opening toward the wall in the outer reception bore that is separate from the third reception bore, on the associated ends of the legs. As a result of these provisions, by bracing the one clamping piece all three ends of the leg are fixed in the clamping part.

If it should be desirable to preassemble the clamping part on the support legs of the baggage carrier, then the clamping piece includes two clamping pieces offset from one another in height, one of which is disposed beneath the bottom of the blind bore embodying the third reception bore and being supported on only one of the ends of the legs.

DRAWINGS

FIG. 3 shows a detail of the baggage carrier of FIG. 1 on a different scale, showing the free ends of the legs and the clamping part of one pair of support legs, the clamping part being secured to an extension piece of a vehicle frame, in a lateral view;

FIG. 4 shows the disposition according to FIG. 3, in a plan view and in section along the line IV—IV of FIG. 3;

FIG. 5 shows a belt holder for the baggage carrier of FIG. 1, in a plan view;

FIG. 6 shows the belt holder of FIG. 5, in a lateral view and in section along the line VI—VI of FIG. 5;

FIG. 7 shows a further exemplary embodiment of a baggage carrier according to the invention, in a fragmentary sectional view along the line VII—VII of FIG. 8 in the vicinity of the rear support leg, in a lateral view;

Figure 1:
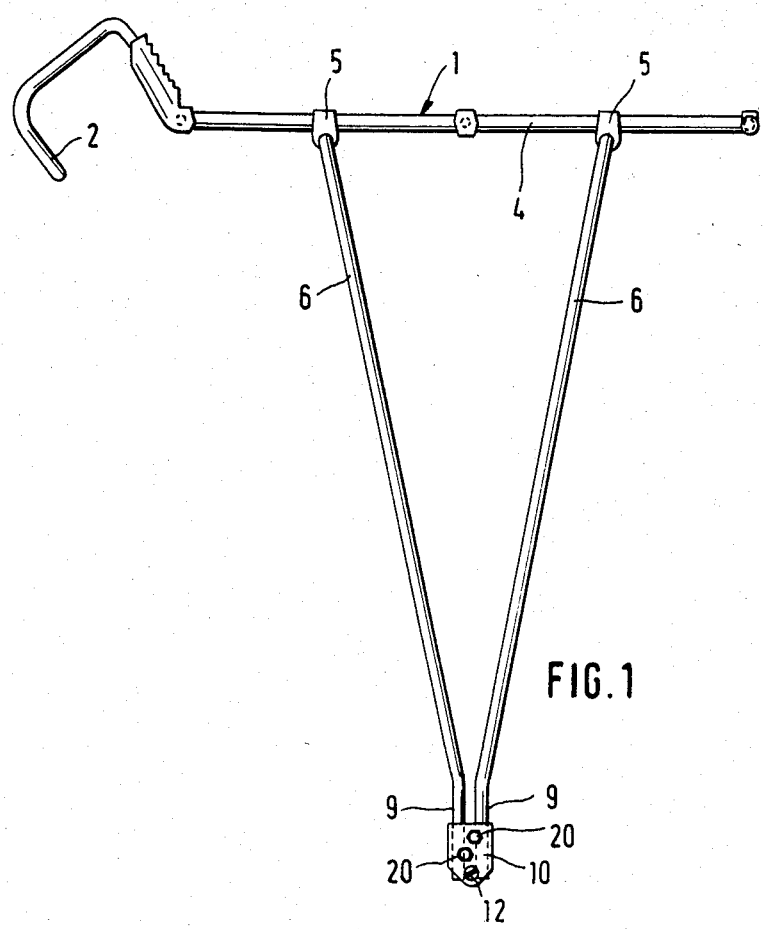
FIG. 1 shows a baggage carrier according to the invention in a lateral view.
Figure 12:
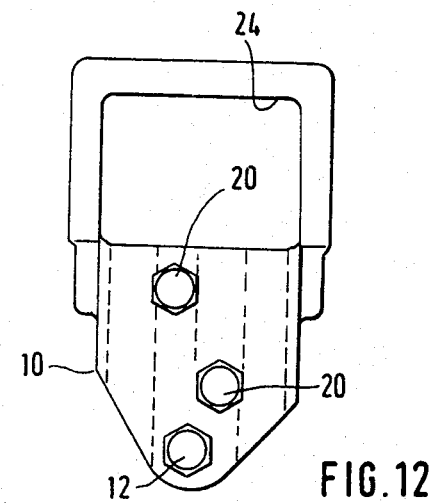
Figure 13:
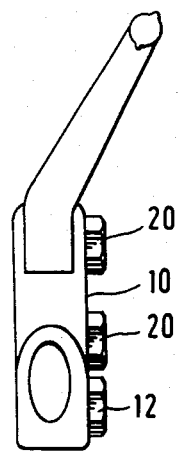
Figure 15:
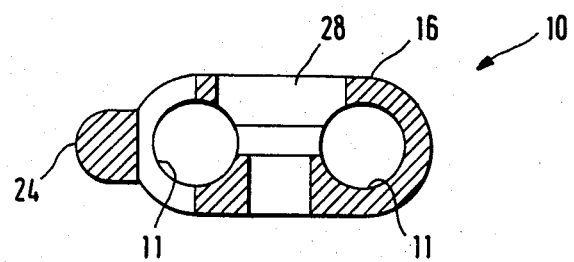
Figure 14:
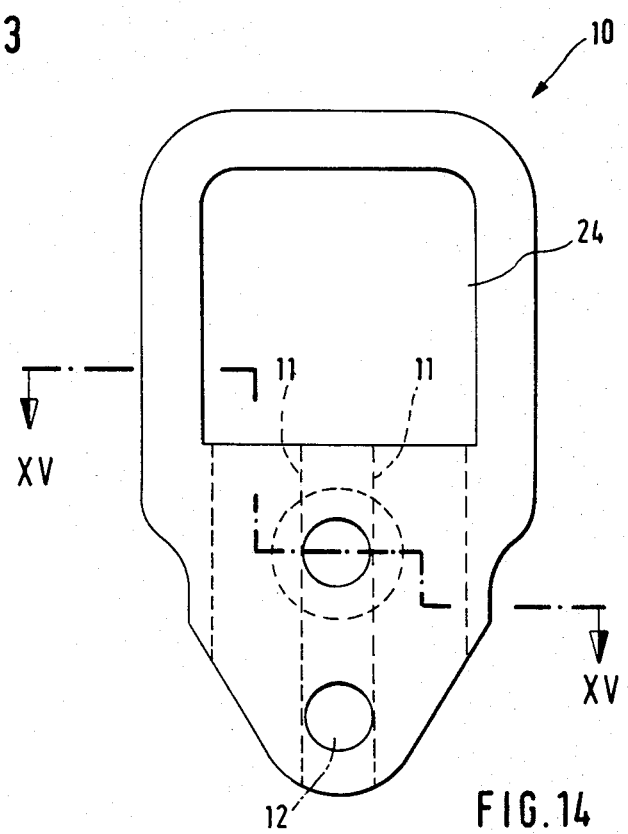

FIGS. 12 and 13 each show a further exemplary embodiment of the clamping part of the baggage carrier of FIG. 7, with an integrally molded opening for the belt; and FIGS. 14 and 15 each show a further exemplary embodiment of the clamping part of the baggage carrier of FIG. 1, with an integrally molded opening for the belt and having only one clamping part for the two ends of the legs, in a lateral view and in a sectional view taken along a line XIV—XIV of FIG. 13, respectively.

DETAILED DESCRIPTION

Figure 2:
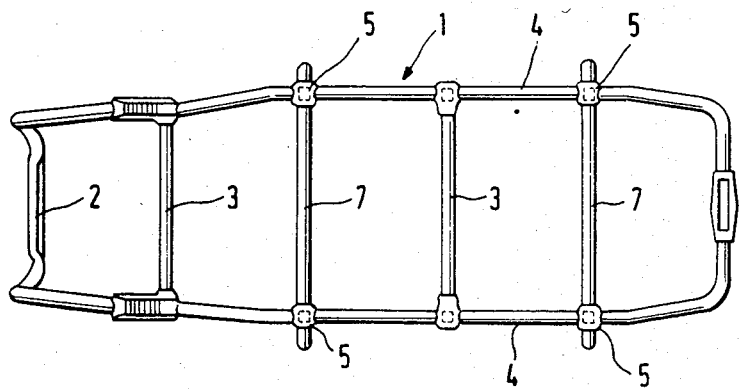
FIG. 2 shows the baggage carrier of FIG. 1 in a plan view.

The baggage carrier shown in FIGS. 1, 2 comprises an oblong, closed frame 1 including the supporting surface for the baggage, on the front side of which a transverse bracket 2 is embodied, with which the baggage carrier can be secured to the rear fork of a two-wheeled vehicle. On each of the side parts 4 of the frame 1, a pair of support legs extending downward toward one another is secured in an articulated manner by means of plastic bearing parts 5. The legs 6 of this pair of support legs extend toward one another in the shape of a V, as shown in FIG. 1. The disposition is selected such that the front legs and the rear legs 6 of the two pairs of legs are connected with one another via respective integrally molded transverse legs 7, which as shown in FIG. 2 perform the same function as the cross-struts 3.

The legs 6 of each pair of support legs, which are made of cylindrical pipe or wire material, are bent at their free ends at 9 in such a manner that they extend approximately parallel to one another and are spaced apart from one another by a short distance (see FIGS. 1, 3). A flat, solid clamping part 10 is placed upon the free ends 9 of the legs 6 of each pair of support legs and has two continuous cylindrical reception bores 11, disposed spaced apart from one another and extending parallel to one another, for the free ends 9 of the legs. The clamping part 10 is provided in the area between the two reception bores 11 with a bore for a fastening screw 12, which passes through a corresponding bore of an extension piece, shown at 13 in FIGS. 3 and 4, of a vehicle frame the other parts of which are not shown. The clamping part 10 is screwed firmly to the extension piece 13 by means of the fastening screw 12 and a nut 14; the fastening screw 12 may serve to receive further struts, belonging to splashboards or the like.

Associated with the two reception bores 11 are two clamping pieces, one of which is shown at 15 in FIG. 4, and which are embodied in the form of a clamping wedge or clamping cone. The clamping wedges or cones 15 are disposed in the vicinity of a contact face 16 of the clamping part 10, the contact face 16 to be placed against the extension piece 13. To this end, the clamping part 10 has a groove-like recess 17 (FIG. 4) opening toward the contact face 16, in which recess the two clamping wedges or cones 15 are disposed beside one another, viewed in the longitudinal direction of the free ends 9 of the legs, and in which they are guided. Each clamping wedge or cone 15 is supported with a wedge or cone surface 18 on the corresponding end 9 of the leg through an opening, toward the wall, of the associated reception bore 11. The clamping wedge or cone 15 has a continuous threaded bore 19, into which a locking screw 20 is threaded; the locking screw 20 can be actuated from the direction of the front of the clamping part 10.

The two locking screws 20 are disposed in the manner shown in FIG. 3 in the area between the two free ends 9 of the legs. They can therefore be actuated easily from the outside when the clamping part 10 is firmly mounted by means of the securing screw 12.

In instances in which the baggage carrier is to be used together with a fastening belt, the belt holder 21 shown in FIGS. 5, 6 can be secured to the clamping part. This belt holder is embodied in the form of a flat, plate-like profile element 22 of U-shaped cross section, which on an obliquely bent end portion 23 has a belt opening 24. Two bores 25 are disposed in the profile element 22, which enable the securing of the belt holder 21, placed upon the clamping part 10, by means of the two locking screws 20.

ASSEMBLY

The assembly of the baggage carrier described above is quite simple:

After the two clamping parts 10 are secured to the two extension pieces 13 by means of the fastening screws 12, the support face of the baggage carier can be positioned horizontally, with the locking screws 20 loosened. The two free ends 9 of the legs then afford a very long distance for adjustment at both sides of the two-wheeled vehicle, and the two legs 6 of each pair of legs can be adjusted individually, apart from the other. Once the correct position has been attained, the locking screws 20 are tightened, thereby fixing the ends 9 of the legs, and thus the pairs 6 of support legs, in the correct position. The baggage carrier may be preassembled with the clamping parts 10 in place on the free ends 9 of its legs, with the clamping parts in turn not having any loose parts when in the preassembled state and being adjusted in height. This is in contrast to the situation in the prior art, in which clamping parts are used which are secured in the form of loose parts upon the extension pieces 13 by means of the locking screws which again are loose parts.

Instead of the clamping wedges or cones 15 being disposed beside one another, the disposition may also be selected such that only a single clamping wedge or cone 15 is provided, which extends over the length of the clamping part 10 as far as the vicinity of the fastening screw 12, and in which clamping wedge or cone two threaded bores 19 are disposed, spaced apart from one another as viewed in the longitudinal direction of the two ends 9 of the legs, each threaded bore 19 containing one locking screw 20. The two threaded bores 19 and the locking screws 20 are laterally offset from one another somewhat, in the manner shown in FIGS. 2, 3, so that one threaded bore 19 always extends immediately beside the associated end 9 of a leg; thus the associated locking screw 20 can exert a strong clamping action upon this end of the leg.

The two legs 6 of each pair of support legs, and in particular the free ends 9 of the legs, may have different diameters. The ends 9 and the clamping wedges or cones 15 can also be manufactured in different hardnesses, so as thereby to avoid a coupled rotation on the part of the circular cones during assembly.

Figure 8:
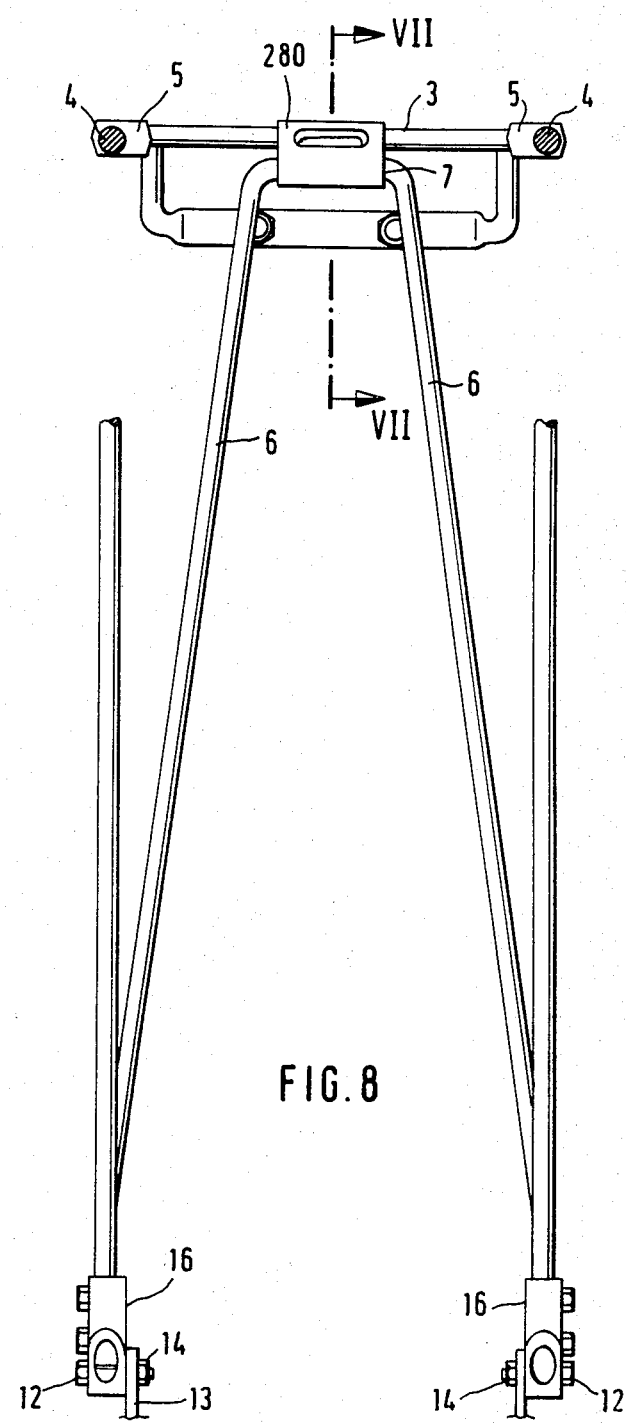
FIG. 8 shows the baggage carrier of FIG. 7 in a front view, in a section taken along the line VIII—VIII of FIG. 7.

FIGS. 7 and 8 show a further exemplary embodiment, in which structural components corresponding to those of the baggage carrier of FIGS. 1 and 2 are identified by the same reference numerals and will not be described again.

The baggage carrier of FIGS. 7 and 8 has on both sides, in addition to the pair of support legs 6 extending toward one another in the form of a V, a further middle support leg 25. The two middle support legs 25 are in turn connected with one another via an integrally molded transverse leg 7, which is connected to the frame 1 in an articulated manner via plastic bearing parts 5. On its free end, the middle support leg 25 is bent at 26 in such a manner that the bent end extends parallel to the ends 9 of the legs 6. The end 26 is likewise secured in the clamping part 10, which to this end includes a further reception bore 27, as may be seen in FIGS. 9 and 10.

To increase the lateral stability of the baggage carrier of FIGS. 7 and 8 and to reduce the vulnerability to lateral oscillation, the two rear support legs 6 which oppose one another with respect to the vehicle extend toward one another, beginning at the clamping parts 10 and being closest together at the frame 1, as shown in FIG. 8. The transverse leg 7 of these two support legs 6 accordingly is also shorter in length than what whould correspond to the width of the frame 1 and is connected in an articulated manner, via a molded plastic part 28 containing two through bores, with the rear cross-strut 3, which passes through one of the through bores of the molded plastic part 28, while the transverse leg 7 passes through the other through bore. Because of this manner of securing the rear support legs 6, manufacturing and securing tolerances can easily be compensated for in the baggage carrier having three support legs on each side.

Figure 9:
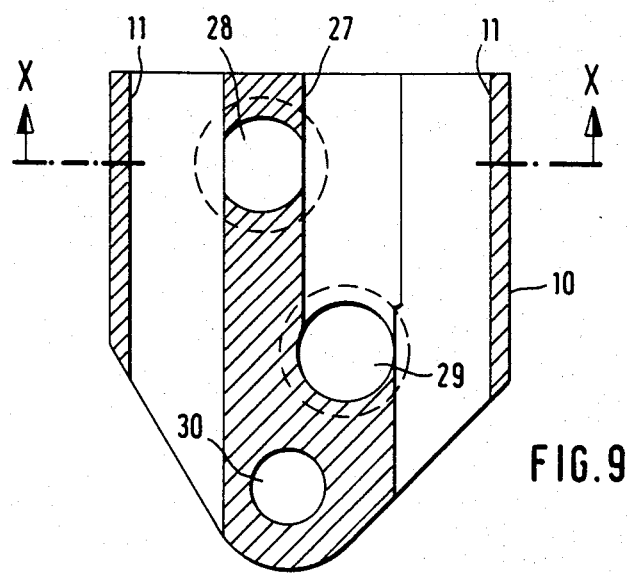
FIG. 9 shows the clamping part for the baggage carrier of FIG. 7, in a longitudinal section.
Figure 10:
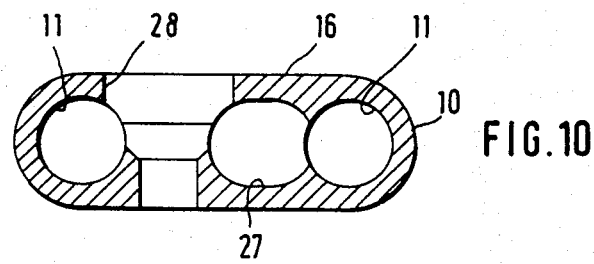
FIG. 10 shows the clamping part of FIG. 9 in a sectional view taken along the line X—X of FIG. 9.

The clamping part 10 shown particularly in FIGS. 9 and 10 and intended for the baggage carrier shown in FIGS. 7 and 8 differs from the clamping part of FIGS. 3 and 4 substantially in that the additional reception bore 27 for the end 26 of the middle support leg 25 is provided between the two outer reception bores 11 for the ends 9 of the front and rear support legs 6. All the reception bores 11 and 27 extend parallel to one another, and their axes are located in a common plane.

The distance by which the reception bore 27 is spaced apart from one of the outer reception bores 11, in FIG. 9 the right-hand reception bore 11, is selected such that the reception bore 11 and the reception bore 27, the latter embodied as a blind bore, intersect one another over the entire length of the reception bore 27, as shown in FIG. 10.

To secure all three ends 9 and 26, a total of two clamping cones 15 is again provided; these cones are located in corresponding stepped bores 28 and 29, which extend at right angles to the reception bores 11 and 27, respectively.

As shown in FIG. 9, the two stepped bores 28 and 29 are disposed at different heights, the stepped bore 29 being provided underneath the reception bore 27 and communicating through a lateral opening with the right-hand reception bore 11. The reception bore 28, contrarily, is located above the stepped bore 29, specifically between the reception bore 27 and the left-hand reception bore 11 separate therefrom. The stepped bore 28, like the stepped bore 29, passes partially through the adjoining reception bores 11 and 27, as is shown for the stepped bore 28 in FIG. 10. In this manner, a clamping cone 15 inserted into the stepped bore 28 or 29 can protrude into the respective adjoining reception bores 11 or 27 and firmly clamp the ends 9 and 26 of the legs located therein, as soon as the screw 20, as described above, is inserted into the clamping cone 15 from the side of the clamping part 10 located opposite the clamping cone 14, through the stepped bore 28, 29, and is tightened.

For assembly, the two clamping parts 10 are first secured to the extension pieces 13 by means of the fastening screws 12, which pass through the associated bores 30. With the locking screws 20 loosened, the ends 9 and 26 of the legs can now be inserted into the associated reception bores 11 and 27, in the course of which the height and the inclination of the baggage carrier can be adjusted by the longitudinal displacement of the ends 9 and 26 in the reception bores 11 and 27. As soon as the desired position is attained, the locking screws 20 are tightened, causing the clamping cones 15 to be drawn into the associated stepped bores 28 and 29, thereby locking the ends 9 and 26 of the legs firmly in the reception bores 11 and 27. The clamping cone 15 located in the stepped bore 29 clamps only the end 9 which is located in the right-hand reception bore, as seen in FIG. 9; to this extent a preassembly is now possible, because the ends 9 and 26 of the legs located in the other two reception bores 11 and 27 are in this case still adjustable. Only when the clamping cone 15 located in the stepped bore 28 is tightened are the other two ends 9 and 26 fixed in position as well.

Figure 11:
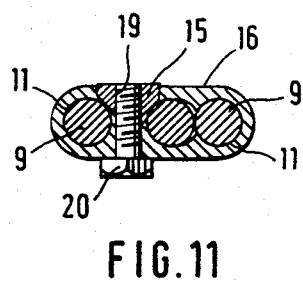
FIG. 11 shows the clamping part of FIG. 9, again in a section taken along the line X—X, but with the ends of the legs inserted and with the clamping part.

Because the reception bore 27 and the right-hand reception bore 11 intersect or in other words overlap one another, all the ends 9 and 26 of the legs are simultaneously clamped firmly by the clamping cone 15 located in the stepped bore 28; the end 9 of the leg which is inserted into the left-hand reception bore 11 is fixed in position directly by the clamping cone 15, while the end 26 is pressed by the clamping cone 15 against the end 9 which is located in the right-hand reception bore 11, as shown in FIG. 11.

If preassembly of the clamping parts on the rear support legs 6 is not necessary, then a clamping cone 15 does not have to be inserted into the stepped bore 19; that is, the stepped bore 29 may also be dispensed with, for the clamping action can be effected solely with the aid of the clamping cone 15 located in the stepped bore 28.

FIGS. 12 and 13 show a clamping part 10 which differs from the clamping part 10 shown in FIGS. 9 and 10 in having an integrally molded opening 24 for a belt; this opening 24 extends laterally beside the two outer reception bores 11 and points obliquely outward away from the center of the vehicle.

In FIGS. 14 and 15, a further exemplary embodiment of the clamping part 10 is shown, which is similar in design to the clamping part of FIG. 9 but is intended for securing the baggage carrier shown in FIGS. 1 and 2, which has two pairs of support legs 6. Accordingly, the clamping part 10 has two reception bores 11 extending parallel to and spaced apart from one another, between which the bore 12 for the screw for securing the clamping part 10 to the corresponding part of the frame, not otherwise shown, is provided in the lower area of the clamping part 10.

Above the bore 12, centrally between the two reception bores 11, only one stepped bore 28 is provided in this embodiment, extending at right angles to the longitudinal axes of the reception bores 11, as is also the case in the clamping part of FIGS. 9 and 10. Here the portion of the stepped bore 28 having the larger diameter passes partway through the reception bores 11, as shown in FIG. 14, resulting in a corresponding opening in the side wall of the reception bores 11, through which a clamping cone such as that shown at 15 in FIG. 14 is inserted into the portion of the stepped bore 28 with the larger diameter and can come into engagement with the ends of the pairs of support legs 6.

If in the case of the clamping part 10 shown in FIGS. 14 and 15 a clamping cone as shown in the foregoing drawing figures is inserted into the stepped bore 28 and tightened by means of a corresponding screw 20 inserted from the opposite side into the stepped bore and threaded into the clamping cone, then both ends of the legs can be fixed simultaneously in the reception bores 11 in a frictionally engaged manner by means of one clamping cone.

I claim:

1. Baggage carrier for two-wheeled vehicles, comprising
   a frame including the supporting surface for the baggage, and
   a pair of support legs extending downward from the frame toward one another at both sides, the legs of which are optionally secured in an articulated manner to the frame and extend toward one another in the form of a V and are bent at the free ends such that they extend beside and approximately parallel to one another, being spaced apart by a short distance from one another,
   wherein the free ends of the legs of each pair of legs can be secured to an extension piece of the vehicle frame in an adjustable manner by means of a clamping part placed upon these ends, the clamping part having a bore for a fastening screw which passes between the two ends of the legs and through a bore in the extension piece,
   wherein, in accordance with the invention,
   the clamping part (10) for each pair of support legs (6) has two continuous through bores (11), extending parallel to one another and disposed at both sides of the bore for the fastening screw (12), for the two associated cylindrical ends (9) of the legs, and wherein associated with the reception bores (11) is at least one clamping piece (15) cooperating with the inserted ends (9) of the legs, the clamping piece (15) being fastenable by means of a locking screw (20) against the ends (9) of the legs and against the clamping part (10), thereby fixing the ends (9) of the legs in their respective installed positions.

2. Baggage carrier according to claim 1, wherein each of the two reception bores (11) has associated with it its own clamping piece (15) with a locking screw (20).

3. Baggage carrier according to claim 1, wherein the flat clamping part (10) has on one side a contact face (16) to be placed against the extension piece (13), and the clamping piece or pieces (15) is or are disposed in the vicinity of this contact face (16).

4. Baggage carrier according to claim 1, wherein each clamping piece is embodied as a clamping wedge or clamping cone (15), which is guided in a corresponding recess (17) of the clamping part (10) and is supported with its wedge or cone surface (18) on the end (9) of the leg through an opening toward the wall of the associated reception bore (11).

5. Baggage carrier according to claim 4, wherein the clamping wedge or cone (15) has a threaded bore (19) for the locking screw (20), the locking screw (20) being accessible from the outside of the clamping part (10).

6. Baggage carrier according to claim 5, wherein each clamping piece (15) and the associated locking screw (20) are disposed in the area between the two reception bores (11).

7. Baggage carrier according to claim 2, wherein the two clamping pieces (15) are disposed beside one another, viewed in the direction of the two ends (9) of the legs.

8. Baggage carrier according to claim 1, wherein a belt holder (21) having an opening (24) for a belt is disposed on the clamping part (10).

9. Baggage carrier according to claim 8, wherein the belt holder (21) is secured to the clamping part (10) by means of the locking screw or screws (20).

10. Baggage carrier according to claim 1, wherein an opening (24) for a belt is molded integrally on the clamping part (10).

11. Baggage carrier according to claim 1, wherein a further support leg (25) is disposed between the support legs (6) of each pair, the free end (26) of which further leg (25) is bent such that it extends parallel to the ends (9) of the associated pair of support legs (6) and is secured on the clamping part (10).

12. Baggage carrier according to claim 1, wherein the two support legs (6) which are located opposite one another with respect to the longitudinal axis of the vehicle and engage the frame (1) forming the supporting surface for the baggage the farthest to the rear of all the support legs are disposed such that they extend toward one another from the clamping parts (10) in the direction toward the frame (10).

13. Baggage carrier according to claim 11, wherein the clamping part (11) has a third reception bore (27) for the middle support leg, the third bore (27) being located between the two outer reception bores (11) for the front and rear support legs (6) and extending parallel to these reception bores (11).

14. Baggage carrier according to claim 13, whrein the longitudinal axes of the reception bores (11, 27) are all located in one plane.

15. Baggage carrier according to claim 13, wherein the third reception bore (27) for the middle support leg (25) is realized as a blind bore.

16. Baggage carrier according to claim 13, wherein the third reception bore (27) for the middle support leg (27) is disposed tightly against one of the two outer reception bores (11) in such a manner that it intersects them at the rim, and that one of the clamping pieces (15) is disposed between the third reception bore (27) for the middle support leg (25) and the outer reception bore (11) separate from this third reception bore, this clamping piece (15) being supported on the associated ends (9, 26) of the legs through an opening toward the wall in the third reception bore (27) and through an opening toward the wall in the outer reception bore (11) that is separate from the third reception bore (27).

17. Baggage carrier according to claim 13, wherein the clamping pieces (15) are offset in height from one another, and one of the clamping pieces (15) is disposed below the third reception bore (27).

18. Baggage carrier according to claim 16, wherein the clamping wedge or cone (15) and the associated ends (9, 26) of the legs, respectively, have a different hardness.

* * * * *